United States Patent
Kojima (10) Patent No.: US 9,088,500 B2
(45) Date of Patent: Jul. 21, 2015

(54) PACKET COMMUNICATION APPARATUS AND PACKET TRANSFER METHOD

(71) Applicant: FUJITSU LIMITED, Kawasaki (JP)

(72) Inventor: Kozo Kojima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 13/679,108

(22) Filed: Nov. 16, 2012

(65) Prior Publication Data

US 2013/0070602 A1    Mar. 21, 2013

Related U.S. Application Data

(63) Continuation of application No. PCT/JP2010/059036, filed on May 27, 2010.

(51) Int. Cl.
| | |
|---|---|
| *H04L 1/00* | (2006.01) |
| *H04L 12/26* | (2006.01) |
| *H04L 12/803* | (2013.01) |
| *H04L 12/931* | (2013.01) |

(52) U.S. Cl.
CPC ............ *H04L 47/125* (2013.01); *H04L 47/122* (2013.01); *H04L 49/505* (2013.01)

(58) Field of Classification Search
USPC ......................................................... 370/323
See application file for complete search history.

(56) References Cited

U.S. PATENT DOCUMENTS

| | | |
|---|---|---|
| 6,496,510 B1 | 12/2002 | Tsukakoshi et al. |
| 6,577,634 B1 | 6/2003 | Tsukakoshi et al. |
| 8,432,788 B2 | 4/2013 | Abdulla et al. |
| 2003/0145109 A1* | 7/2003 | Nakashima .................... 709/241 |
| 2005/0135343 A1 | 6/2005 | Karino et al. |
| 2006/0198382 A1 | 9/2006 | Sagara et al. |

FOREIGN PATENT DOCUMENTS

| | | |
|---|---|---|
| JP | 06-230992 | 8/1994 |
| JP | 11-68949 | 3/1999 |

(Continued)

OTHER PUBLICATIONS

Miyuki Hanaoka, et al., "Brownie: Collaboration of Network Intrusion Detection Systems", The Special Interest Group Technical Reports of IPSJ, Information Processing Society of Japan, Apr. 15, 2009, vol. 2009-OS-111, No. 4, pp. 1 to 8.

(Continued)

*Primary Examiner* — Kwang B Yao
*Assistant Examiner* — Adam Duda
(74) *Attorney, Agent, or Firm* — Staas & Halsey LLP (57) ABSTRACT

A packet communication apparatus includes a packet processing determining unit that receives packets and determines whether or not to instruct a first-type packet processing device in the packet communication apparatus to perform predetermined packet processing with respect to the received packets; a searching unit that, when a transfer speed of packets determined to be subjected to the predetermined packet processing by the packet processing determining unit exceeds a processing speed of the first-type packet processing device, searches for another packet communication apparatus that includes a second-type packet processing device which performs packet processing identical to the predetermined packet processing; and a transfer unit that transfers the packets to the other packet communication apparatus retrieved by the searching unit.

3 Claims, 6 Drawing Sheets

(56) References Cited

FOREIGN PATENT DOCUMENTS

| | | |
|---|---|---|
| JP | 2000-83045 | 3/2000 |
| JP | 2002-135508 | 5/2002 |
| JP | 2003-22209 | 1/2003 |
| JP | 2003-218916 | 7/2003 |
| JP | 2007-179243 | 7/2007 |
| JP | 2008-226023 | 9/2008 |
| JP | 2008-293492 | 12/2008 |
| WO | WO 2005/060187 | 6/2005 |

OTHER PUBLICATIONS

Japanese Office Action for corresponding Japanese Application 2012-517062; mailed Jun. 4, 2013.
International Search Report of PCT/JP2010/059036 mailed Jun. 22, 2010.
G. Welling et al., "A Cluster-Based Active Router Architecture," *IEEE Micro*, Jan.-Feb. 2011, pp. 16-25.

* cited by examiner

| APPARATUS NUMBERS | HWA TYPES | PROCESSING SPEEDS | TRANSFER DESTINATION ADDRESSES |
|---|---|---|---|
| 1 | A | 100 | PPP |
| 2 | B | 200 | QQQ |
| 3 | A | 100 | RRR |
| 4 | A | 100 | SSS |
| 5 | C | 250 | TTT |
| ... | ... | ... | ... |

FIG.8

RELATED ART

FIG.9

PACKET COMMUNICATION APPARATUS AND PACKET TRANSFER METHOD

CROSS-REFERENCE TO RELATED APPLICATION

This application is a continuation of International Application No. PCT/JP2010/059036, filed on May 27, 2010, the entire contents of which are incorporated herein by reference.

FIELD

The embodiments discussed herein are related to a packet communication apparatus and a packet transfer method.

BACKGROUND

Typically, packet communication apparatuses such as routers are used to transfer packets within a network. In such packet communication apparatuses, due to the increasing demand for sophistication in recent years, it has become mainstream to not only implement a normal routing function for the purpose of transferring packets to other apparatuses but also to perform packet processing such as compression/decompression or encoding/decoding with respect to the packets.

Figure 9:
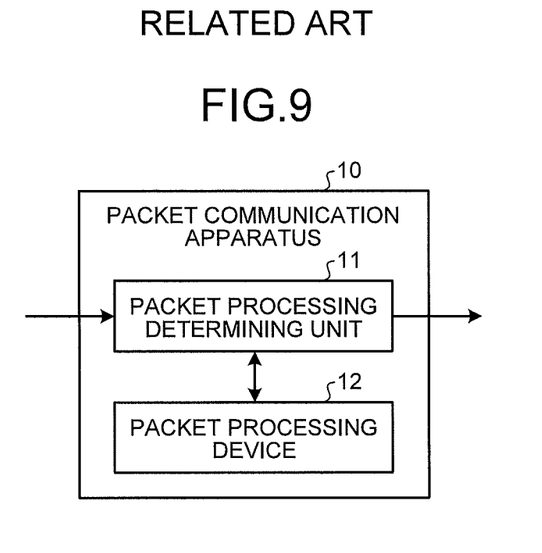
FIG. 9 is a diagram for explaining a typical packet communication apparatus.

FIG. 9 is a diagram for explaining a typical packet communication apparatus. As illustrated in FIG. 9, a typical packet communication apparatus 10 includes a packet processing determining unit 11 and a packet processing device 12.

The packet processing determining unit 11 is, for example, an NWP (Network Processor) that receives packets and determines whether or not to instruct the packet processing device 12 to perform packet processing such as compression/decompression or encoding/decoding with respect to the received packets. For example, the packet processing determining unit 11 analyzes the header information of the received packets. Then, if the header information contains control information which indicates that packet processing is not yet performed, then the packet processing determining unit 11 determines to instruct the packet processing device 12 to perform packet processing with respect to the received packets.

If it is determined not to instruct the packet processing device 12 to perform packet processing, then the packet processing determining unit 11 implements the normal routing function and transfers the received packets to another packet communication apparatus. On the other hand, if it is determined to instruct the packet processing device 12 to perform packet processing, then the packet processing determining unit 11 outputs the received packets to the packet processing device 12.

The packet processing device 12 is, for example, an HWA (Hardware Accelerator) that performs packet processing with respect to the packets received from the packet processing determining unit 11, and sends back the post-packet-processing packets to the packet processing determining unit 11. Herein, to the header information of the post-packet-processing packets, the packet processing device 12 appends control information which indicates that the packets have already been subjected to packet processing.

[Patent Literature 1]: Japanese Laid-open Patent Publication No. 2000-83045
[Patent Literature 2]: Japanese Laid-open Patent Publication No. 2008-226023

However, while establishing a network among typical packet communication apparatuses of the abovementioned type, some packet communication apparatuses happen to take intensive processing load, thereby leading to the possibility of congestion.

For example, assume that a network is established in which edge-side packet communication apparatuses are connected below core-side packet communication apparatuses. In that case, a core-side packet communication apparatus implements the normal routing function and transfers the received packets to another packet communication apparatus. In contrast, an edge-side packet communication apparatus not only transfers the received packets to another packet communication apparatus but also performs packet processing with the use of the packet processing device installed therein. Hence, as compared to the core-side packet communication apparatuses, the edge-side packet communication apparatuses happen to take intensive processing load. As a result, in an edge-side packet communication apparatus, when the transfer speed of packets that are determined to be subjected to packet processing exceeds the processing speed of the corresponding packet processing device, it results in congestion in the line.

SUMMARY

According to an aspect of an embodiment, a packet communication apparatus includes a packet processing determining unit that receives packets and determines whether or not to instruct a first-type packet processing device in the packet communication apparatus to perform predetermined packet processing with respect to the received packets; a searching unit that, when a transfer speed of packets determined to be subjected to the predetermined packet processing by the packet processing determining unit exceeds a processing speed of the first-type packet processing device, searches for another packet communication apparatus that includes a second-type packet processing device which performs packet processing identical to the predetermined packet processing; and a transfer unit that transfers the packets to the other packet communication apparatus retrieved by the searching unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

However, the packet communication apparatus and the packet transfer method laid open in this application are not limited to the embodiments described below.

[a] First Embodiment

Figure 1:
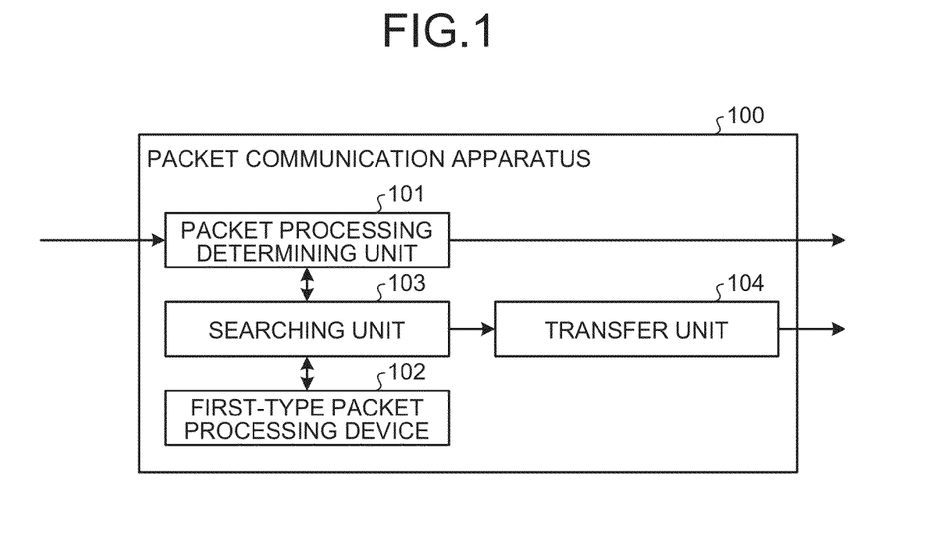
FIG. 1 is a configuration of a packet communication apparatus according to a first embodiment.

First of all, explained below with reference to FIG. 1 is a configuration of a packet communication apparatus according to a first embodiment. Herein, FIG. 1 is a diagram illustrating a configuration of a packet communication apparatus 100 according to the first embodiment. As illustrated in FIG. 1, the packet communication apparatus 100 according to the first embodiment includes a packet processing determining unit 101, a first-type packet processing device 102, a searching unit 103, and a transfer unit 104.

The packet processing determining unit 101 receives packets and determines whether or not to instruct the first-type packet processing device 102 to perform predetermined packet processing with respect to the received packets. For example, the packet processing determining unit 101 analyzes the header information of the received packets. Then, if the header information contains control information which indicates that packet processing is not yet performed, then the packet processing determining unit 101 determines to instruct the first-type packet processing device 102 to perform packet processing with respect to the received packets.

If it is determined not to instruct the first-type packet processing device 102 to perform packet processing, then the packet processing determining unit 101 implements the normal routing function and transfers the received packets to another packet communication apparatus. On the other hand, if it is determined to instruct the first-type packet processing device 102 to perform packet processing, then the packet processing determining unit 101 outputs the received packets to the first-type packet processing device 102.

The first-type packet processing device 102 performs packet processing with respect to the packets that are received from the packet processing determining unit 101, and sends back the post-packet-processing packets to the packet processing determining unit 101. Herein, the packet processing includes a variety of processing such as compression/decompression, encoding/decoding, checksum check/checksum generator, upper layer flow identification, flow unit QoS (Quality of Service) control, virus scanning, and contents filtering. Meanwhile, to the header information of the post-packet-processing packets, the first-type packet processing device 102 appends control information which indicates that the packets have already been subjected to packet processing.

If the transfer speed of the packets that are input to the first-type packet processing device 102 exceeds the processing speed of the first-type packet processing device 102, then the searching unit 103 searches for other packet communication apparatuses that include a second-type packet processing device which performs identical packet processing. Then, to the other packet communication apparatuses that are retrieved by the searching unit 103, the transfer unit 104 transfers the packets that were input to the first-type packet processing device 102.

As described above, if the transfer speed of the packets exceeds the processing speed of the first-type packet processing device 102, then the packet communication apparatus 100 according to the first embodiment searches for other packet communication apparatuses that include a second-type packet processing device which performs identical packet processing. Then, to the other packet communication apparatuses that are retrieved, the packet communication apparatus 100 transfers the packets that were input to the first-type packet processing device 102. Because of that, the packet communication apparatus 100 becomes able to divert the processing load on the first-type packet processing device 102 installed therein to other packet communication apparatuses within the network. As a result, even in the case when the packet communication apparatus 100 is used as an edge-side packet communication apparatus within the network, the packet communication apparatus 100 can prevent a situation of having to take intensive processing load. Hence, the packet communication apparatus 100 can prevent congestion from occurring in the network.

[b] Second Embodiment

Given below is the explanation of a packet communication apparatus according to a second embodiment. Herein, the explanation is given regarding a packet transfer method performed by the packet communication apparatus according to the second embodiment. That explanation is followed by the explanation regarding a configuration of the packet communication apparatus according to the second embodiment and regarding a sequence of operations performed by the packet communication apparatus according to the second embodiment.

Figure 2:
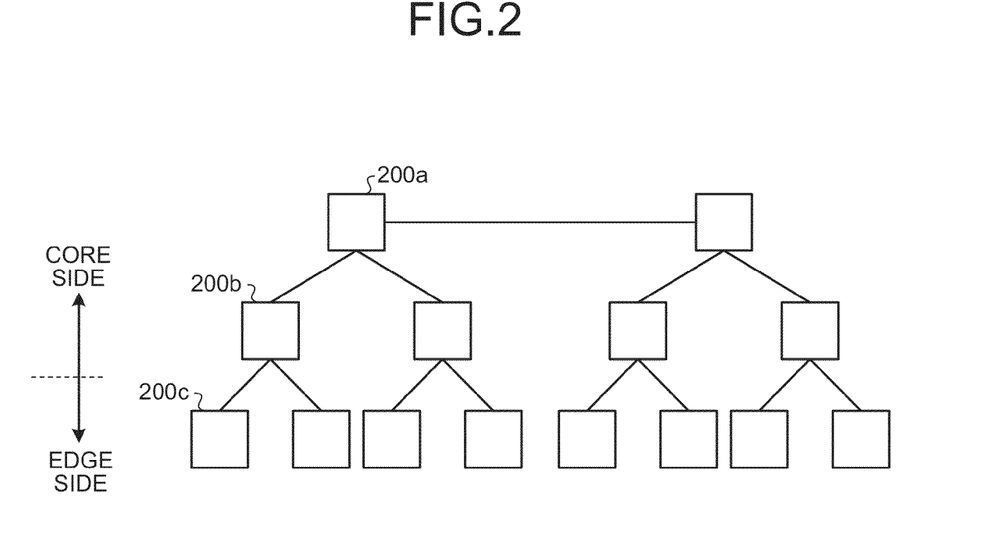
FIG. 2 is a diagram for explaining an example of a packet transfer method performed by a packet communication apparatus according to a second embodiment.
Figure 3:
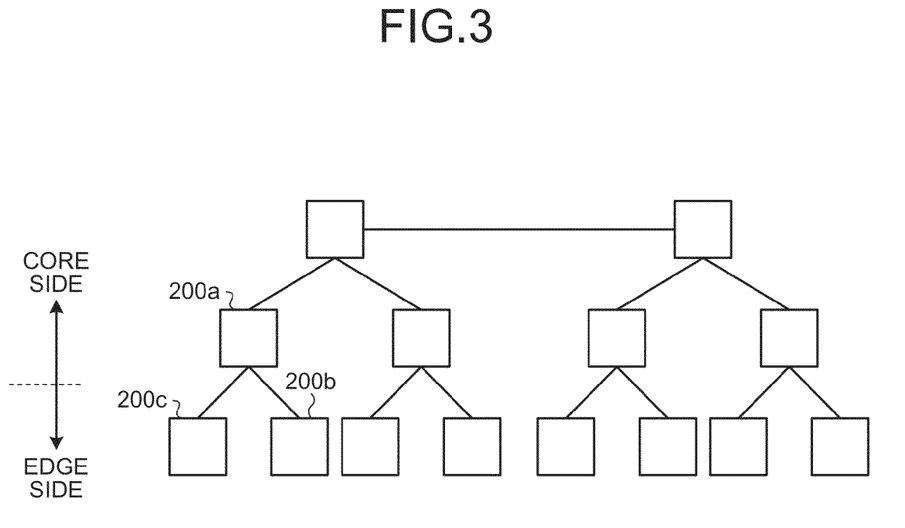
FIG. 3 is a diagram for explaining another example of the packet transfer method performed by the packet communication apparatus according to the second embodiment.

Firstly, explained below with reference to FIG. 2 and FIG. 3 is the packet transfer method performed by the packet communication apparatus according to the second embodiment. FIG. 2 is a diagram for explaining an example of the packet transfer method performed by the packet communication apparatus according to the second embodiment. In a network illustrated in FIG. 2, it is assumed that packet processing devices installed in core-side packet communication apparatuses 200a and 200b perform identical packet processing to the packet processing performed by a packet processing device installed in an edge-side packet communication apparatus 200c. Moreover, it is assumed that the edge-side packet communication apparatus 200c is the packet communication apparatus that implements the packet transfer method according to the second embodiment.

As illustrated in FIG. 2, the packet communication apparatus 200c receives packets from a predetermined input port and determines whether or not to instruct a first-type packet processing device installed therein to perform packet processing with respect to the received packets. Herein, it is assumed that the packet communication apparatus 200c determines to instruct the first-type packet processing device to perform packet processing.

Then, the packet communication apparatus 200c determines whether or not the transfer speed of the packets that are determined to be subjected to packet processing has exceeded the processing speed of the first-type packet processing device. For example, if the first-type packet processing device is assumed to have a processing speed of 200 Mbps, then the packet communication apparatus 200c determines whether or not the transfer speed of the packets that are determined to be subjected to packet processing has exceeded 200 Mbps.

If the transfer speed of the packets that are determined to be subjected to packet processing is equal to or less than the processing speed of the first-type packet processing device, then the packet communication apparatus 200c instructs the first-type packet processing device to perform packet processing.

On the other hand, if the transfer speed of the packets that are determined to be subjected to packet processing has exceeded the processing speed of the first-type packet processing device, then the packet communication apparatus 200c searches for other packet communication apparatuses that include a second-type packet processing device which performs identical packet processing. In the example illustrated in FIG. 2, the packet communication apparatus 200c searches for the packet communication apparatuses 200a and 200b each of which includes the second-type packet processing device that performs identical packet processing.

At that time, the packet communication apparatus 200c determines whether or not the transfer speed of the packets that are determined to be subjected to packet processing has exceeded the total processing speed that is obtained by adding the processing speed of the first-type packet processing device and the processing speeds of the second-type packet processing devices in other packet communication apparatuses. In the example illustrated in FIG. 2, if the first-type packet processing device in each of the packet communication apparatuses 200a, 200b, and 200c is assumed to have a processing speed of 200 Mbps, then the packet communication apparatus 200c determines whether or not the transfer speed of the packets has exceeded 200+200+200 Mbps.

If the transfer speed of the packets is equal to or less than the total processing speed that is obtained by adding the processing speed of the first-type packet processing device and the processing speeds of the second-type packet processing devices, then the packet communication apparatus 200c transfers the packet to the other communication apparatuses each of which includes the second-type packet processing device. In the example illustrated in FIG. 2, the packet communication apparatus 200c sends the packets to the packet communication apparatuses 200a and 200b each of which includes the second-type packet processing device.

At that time, when a plurality of other packet communication apparatuses is retrieved, the packet communication apparatus 200c transfers packets depending on the processing speed ratio of the packet processing device installed in each of the other packet communication apparatuses. In the example illustrated in FIG. 2, if it is assumed that the processing speed of the packet processing device in the packet communication apparatus 200a is 100 Mbps and the processing speed of the packet processing device in the packet communication apparatus 200b is 200 Mbps, then the packet communication apparatus 200c transfers the packets in the ratio of 1:2 for the packet communication apparatuses 200a and 200b.

On the other hand, if the transfer speed of the packets exceeds the total processing speed that is obtained by adding the processing speed of the first-type packet processing device and the processing speeds of the second-type packet processing devices, then the packet communication apparatus 200c destroys the excess packets.

FIG. 3 is a diagram for explaining another example of the packet transfer method performed by the packet communication apparatus according to the second embodiment. In a network illustrated in FIG. 3, it is assumed that the packet processing device installed in the core-side packet communication apparatus 200a performs identical packet processing to the packet processing performed by the packet processing devices installed in the edge-side packet communication apparatuses 200b and 200c. Moreover, it is assumed that the edge-side packet communication apparatuses 200b and 200c are the packet communication apparatuses that implement the packet transfer method according to the second embodiment.

As illustrated in FIG. 3, each of the packet communication apparatuses 200b and 200c receives packets from a predetermined input port and determines whether or not to instruct the corresponding first-type packet processing device to perform packet processing with respect to the received packets. Herein, it is assumed that the packet communication apparatuses 200b and 200c determine to instruct the respective first-type packet processing devices to perform packet processing.

Then, each of the packet communication apparatuses 200b and 200c determines whether or not the transfer speed of the packets that are determined to be subjected to packet processing exceeds the processing speed of the corresponding first-type packet processing device. For example, if the first-type packet processing device is assumed to have a processing speed of 200 Mbps, then each of the packet communication apparatuses 200b and 200c determine whether or not the transfer speed of the packets that are determined to be subjected to packet processing has exceeded 200 Mbps.

If the transfer speed of the packets that are determined to be subjected to packet processing is equal to or less than the processing speeds of the first-type packet processing devices, then the packet communication apparatuses 200b and 200c instruct the respective first-type packet processing devices to perform packet processing.

On the other hand, if the transfer speed of the packets that are determined to be subjected to packet processing has exceeded the processing speed of the first-type packet processing devices, then each of the packet communication apparatuses 200b and 200c searches for other packet communication apparatuses that include a second-type packet processing device which performs identical packet processing. In the example illustrated in FIG. 3, each of the packet communication apparatus 200b and 200c searches for the packet communication apparatus 200a that includes a second-type packet processing device which performs identical packet processing.

At that time, each of the packet communication apparatuses 200b and 200c determines whether or not the transfer speed of the packets that are determined to be subjected to packet processing has exceeded the total processing speed that is obtained by adding the processing speed of the corresponding first-type packet processing device and the processing speeds of the second-type packet processing devices in other packet communication apparatuses. In the example illustrated in FIG. 3, if the first-type packet processing device in each of the packet communication apparatuses 200a, 200b, and 200c is assumed to have a processing speed of 200 Mbps, then each of the packet communication apparatuses 200b and 200c determines whether or not the transfer speed of the packets has exceeded 200+200 Mbps.

If the transfer speed of the packets is equal to or less than the total processing speed that is obtained by adding the processing speed of the first-type packet processing device and the processing speeds of the second-type packet processing devices, then each of the packet communication apparatuses 200b and 200c transfers the packet to the other communication apparatuses each of which includes the second-type packet processing device. In the example illustrated in FIG. 3, each of the packet communication apparatuses 200b and 200c sends the packets to the packet communication apparatus 200a that includes the second-type packet processing device.

On the other hand, if the transfer speed of the packets exceeds the total processing speed that is obtained by adding the processing speed of the first-type packet processing device and the processing speeds of the second-type packet processing devices, then each of the packet communication apparatuses 200b and 200c destroys the excess packets.

In this way, in the packet transfer method according to the second embodiment, when the transfer speed of packets exceeds the processing speed of the first-type packet processing device in the own apparatus, a search is performed to find other packet communication apparatuses each of which includes the second-type packet processing device that performs identical packet processing to the first-type packet processing device. Then, in the packet transfer method according to the second embodiment, the packets that are input to the first-type packet processing device are transferred to the other packet communication apparatuses that are retrieved. For that reason, in the packet transfer method according to the second embodiment, the processing load of the first-type packet processing device in a particular packet communication apparatus can be diverted to other packet communication apparatuses in the network. As a result, in the packet transfer method according to the second embodiment, it becomes possible to prevent a situation in which edge-side packet communication apparatuses happen to take intensive processing load. That makes it possible to prevent congestion from occurring in the network.

Moreover, in the packet transfer method according to the second embodiment, if the transfer rate of packets exceeds the total processing speed that is obtained by adding the processing speed of the first-type packet processing device and the processing speeds of the second-type packet processing devices, then the excess packets are destroyed. As a result, unnecessary packets can be prevented from being output in the network.

Furthermore, in the packet transfer method according to the second embodiment, if there is a plurality of other packet communication apparatuses each of which includes the second-type packet processing device, then the packets are transferred depending on the processing speed ratio of the packet processing device installed in each of the other packet communication apparatuses. Hence, in the packet transfer method according to the second embodiment, the processing load of the first-type packet processing device in a particular packet communication apparatus can be efficiently diverted to the other packet communication apparatuses present in the network.

Figure 4:
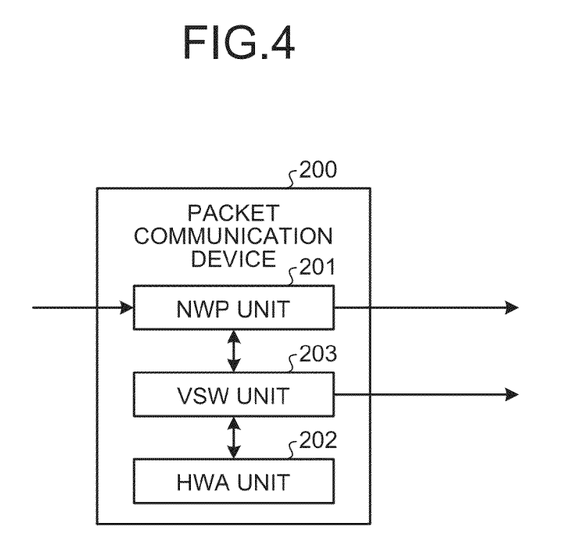
FIG. 4 is a block diagram illustrating a configuration of the packet communication apparatus according to the second embodiment.

Explained below with reference to FIG. 4 is a configuration of the packet communication apparatus 200 according to the second embodiment. FIG. 4 is a block diagram illustrating a configuration of the packet communication apparatus 200 according to the second embodiment. Herein, the packet communication apparatus 200 illustrated in FIG. 4 corresponds to the edge-side packet communication apparatus 200c illustrated in FIG. 2 as well as corresponds to the edge-side packet communication apparatuses 200b and 200c illustrated in FIG. 3.

As illustrated in FIG. 4, the packet communication apparatus 200 includes an NWP unit 201, an HWA unit 202, and a VSW (Virtual Switch) unit 203. The NWP unit 201 receives packets from a predetermined port and determines whether or not to instruct the HWA unit 202 to perform packet processing such as compression/decompression or encoding/decoding with respect to the received packets. For example, the NWP unit 201 analyzes the header information of the received packets. If the header information contains control information which indicates that packet processing is not yet performed, then the NWP unit 201 determines to instruct the HWA unit 202 to perform packet processing with respect to the received packets.

If it is determined not to instruct the HWA unit 202 to perform packet processing, then the NWP unit 201 implements the normal routing function and transfers the received packets to another packet communication apparatus. On the other hand, if it is determined to instruct the HWA unit 202 to perform packet processing, the NWP unit 201 outputs the received packets to the HWA unit 202 via the VSW unit 203. Meanwhile, the NWP unit 201 is an example of the packet processing determining unit 101 illustrated in FIG. 1.

The HWA unit 202 performs packet processing with respect to the packets received from the NWP unit 201 via the VSW unit 203, and sends back the post-packet-processing packets to the NWP unit 201 via the VSW unit 203. Herein, the packet processing includes a variety of processing such as compression/decompression, encoding/decoding, checksum check/checksum generator, upper layer flow identification, flow unit QoS control, virus scanning, and contents filtering. Meanwhile, to the header information of the post-packet-processing packets, the HWA unit 202 appends control information which indicates that the packets have already been subjected to packet processing. Meanwhile, the HWA unit 202 is an example of the first-type packet processing device 102 illustrated in FIG. 1.

Figure 5:
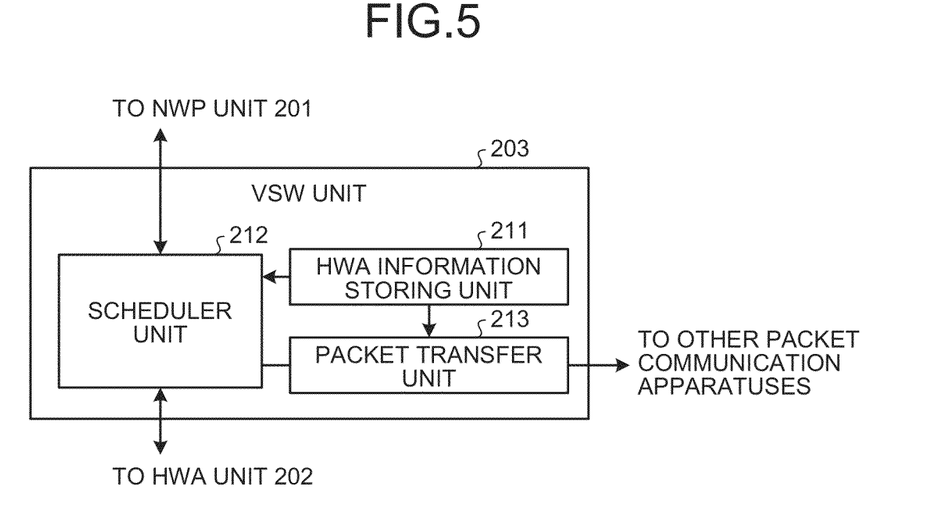
FIG. 5 is a block diagram illustrating a configuration of a VSW unit illustrated in FIG. 4.

The VSW unit 203 is a processing unit that processes the packets that are input from the NWP unit 201 to the HWA unit 202. FIG. 5 is a block diagram illustrating a configuration of the VSW unit 203 illustrated in FIG. 4. As illustrated in FIG. 5, the VSW unit 203 includes an HWA information storing unit 211, a scheduler unit 212, and a packet transfer unit 213.

Figure 6:
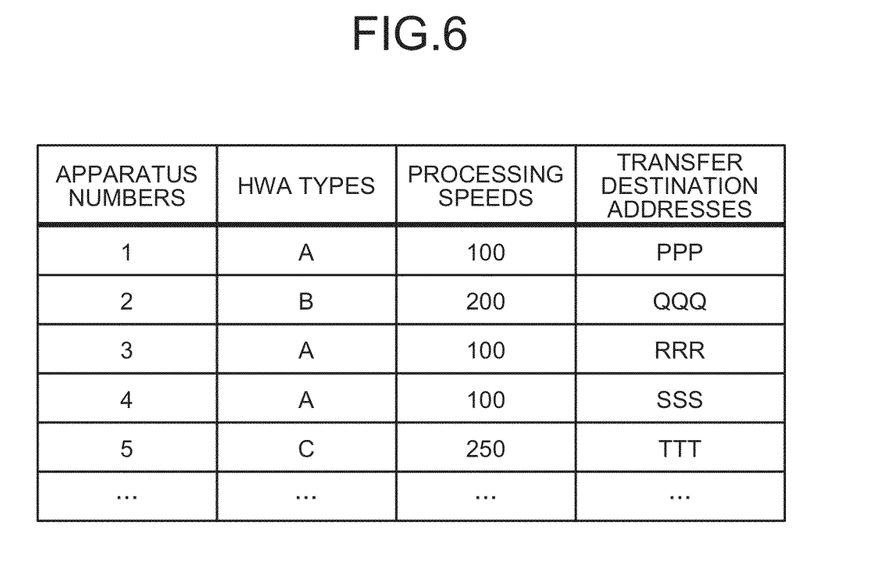
FIG. 6 is a diagram illustrating an example of an HWA information storing unit.

The HWA information storing unit 211 is used to store a variety of HWA-unit related information in a corresponding manner to apparatus numbers that enable identification of the packet communication apparatuses present in the network. In FIG. 6 is illustrated an example of the HWA information storing unit 211. As illustrated in FIG. 6, the HWA information storing unit 211 has items such as "apparatus numbers", "HWA types", "processing speeds", and "transfer destination addresses".

The item "apparatus numbers" represents numbers that enable identification of packet communication apparatuses present in the network. The item "HWA types" represents the types of packet processing performed by the HWA units installed in the packet communication apparatuses each of which is identified by an apparatus number. The item "processing speeds" represents the processing speeds of the HWA units. The item "transfer destination addresses" represents the IP addresses of the packet communication apparatuses each of which is identified by an apparatus number.

For example, in the HWA information storing unit 211 illustrated in FIG. 6, the first row indicates that an HWA unit performing packet processing "A" is installed in a packet communication apparatus identified by the apparatus number "1", and the processing speed of packet processing performed by that HWA unit is "100" Mbps. Moreover, in the HWA information storing unit 211 illustrated in FIG. 6, the first row indicates that the IP address "PPP" is used at the time of transferring packets to the packet communication apparatus identified by the apparatus number "1". Furthermore, in the HWA information storing unit 211 illustrated in FIG. 6, the first row and the third row indicate that the HWA unit that is installed in the packet communication apparatus identified by the apparatus number "1" performs the same packet processing "A" as performed by the HWA unit that is installed in the packet communication apparatus identified by the apparatus number "3".

The scheduler unit 212 determines whether or not the transfer speed of the packets that are input from the NWP unit 201 has exceeded the processing speed of the HWA unit 202. More particularly, from the HWA information storing unit 211, the scheduler unit 212 reads the processing speed (for example, "100" Mbps) of packet processing (for example, "A") that is performed by the corresponding HWA unit (for example, the HWA unit corresponding to the apparatus number "1"). Then, the scheduler unit 212 determines whether or not the transfer speed of that packets that are input from the NWP unit 201 has exceeded the processing speed that has been read (for example, "100" Mbps).

If the transfer speed of the packets that are input from the NWP unit 201 is equal to or less than the processing speed of the HWA unit 202, then the scheduler unit 212 outputs the packets to the HWA unit 202. Later, upon receiving the post-packet-processing packets from the HWA unit 202, the scheduler unit 212 outputs the post-packet-processing packets to the NWP unit 201.

On the other hand, if the transfer speed of the packets that are input from the NWP unit 201 has exceeded the processing speed of the HWA unit 202, then the scheduler unit 212 searches for other packet communication apparatuses that include the HWA unit which performs identical packet processing to the packet processing performed by the HWA unit 202. More particularly, when the transfer speed of the packets that are input from the NWP unit 201 exceeds the processing speed of the HWA unit 202, then the scheduler unit 212 refers to the HWA information storing unit 211 and searches for other packet communication apparatuses (corresponding to the apparatus numbers "3" and "4") each of which includes the HWA unit that performs identical packet processing to packet processing ("A") performed by the corresponding HWA unit 202 (for example, the HWA unit corresponding to the apparatus number "1").

At that time, the scheduler unit 212 determines whether or not the transfer speed of the packets that are input from the NWP unit 201 has exceeded the total processing speed that is obtained by adding the processing speed of the HWA unit 202 and the processing speeds of the HWA units in the other packet communication apparatuses. More particularly, from the HWA information storing unit 211, the scheduler unit 212 reads the processing speed (for example, "100" Mbps) of the corresponding HWA unit 202 (for example, the HWA unit corresponding to the apparatus number "1"). Moreover, from the HWA information storing unit 211, the scheduler unit 212 reads the processing speeds (for example "100" Mbps) of the HWA units installed in the other packet communication apparatuses (for example, the packet communication apparatuses corresponding to the apparatus numbers "3" and "4"). Then, the scheduler unit 212 obtains the total processing speed that is obtained by adding the processing speeds that have been read (for example, "100"+"100"+"100"="300"). Then, the scheduler unit 212 determines whether or not the transfer speed of the packets that are input from the NWP unit 201 has exceeded the total processing speed that is obtained by adding the processing speeds that have been read.

If the transfer speed of the packets that are input from the NWP unit 201 is equal to or less than the total processing speed, then the scheduler unit 212 outputs the information regarding the other packet communication apparatuses that are retrieved as well as outputs the packets to the packet transfer unit 213.

On the other hand, if the transfer speed of the packets that are input from the NWP unit 201 has exceeded the total processing speed, then the scheduler unit 212 destroys the excess packets starting from the low-priority packets, and outputs the remaining packets to the packet transfer unit 213. Meanwhile, the scheduler unit 212 is an example of the searching unit 103 illustrated in FIG. 1.

To the other packet communication apparatuses that are retrieved by the scheduler unit 212, the packet transfer unit 213 transfers the packets that are input from the scheduler unit 212. More particularly, from the HWA information storing unit 211, the packet transfer unit 213 reads the transfer destination addresses (for example, "RRR" and "SSS") of the other packet communication apparatuses (in the example given above, the other packet communication apparatuses identified by the apparatus numbers "3" and "4"). Then, the packet transfer unit 213 transfers the packets, which are input from the scheduler unit 212, to the packet communication apparatuses (identified by the apparatus numbers "3" and "4") that correspond to the transfer destination addresses which have been read.

At that time, if a plurality of other packet communication apparatuses is retrieved by the scheduler unit 212, then the packet transfer unit 213 transfers that packets depending on the processing speed ratio of the HWA unit installed in each of the other packet communication apparatuses. For example, if the scheduler unit 212 retrieves two packet communication apparatuses (in the example given above, the packet communication apparatuses identified by the apparatus numbers "3" and "4"); then the packet transfer unit 213 reads the processing speeds of the respective HWA units ("100" Mbps for each HWA unit) from the HWA information storing unit 211. Subsequently, the packet transfer unit 213 transfers the packets to each of the two packet communication apparatuses (identified by the apparatus numbers "3" and "4") according to the processing speed ratios that have been read ("100":"100"=1:1). Meanwhile, the packet transfer unit 213 is an example of the transfer unit 104 illustrated in FIG. 1.

Figure 7:
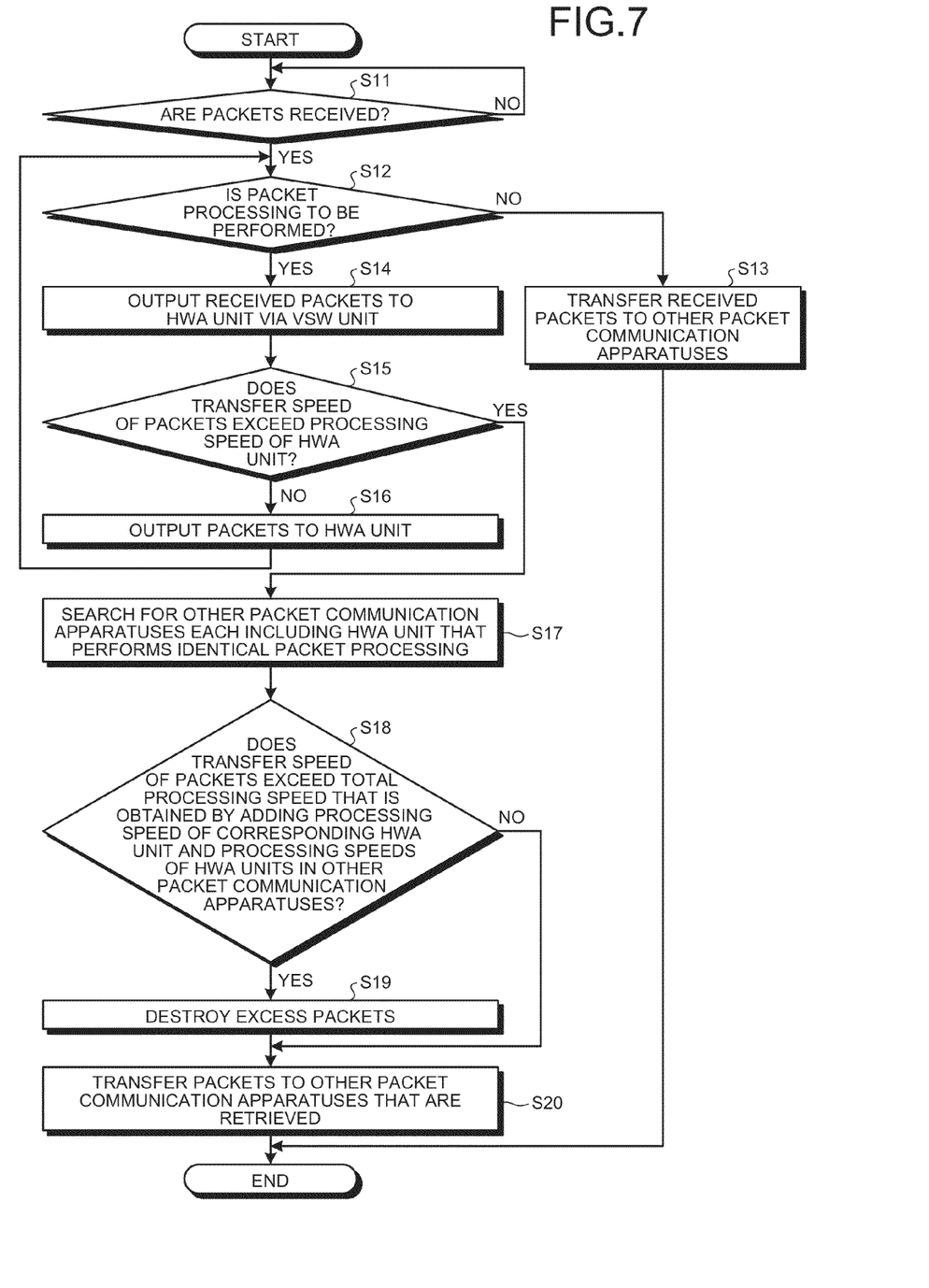
FIG. 7 is a flowchart for explaining a sequence of operations performed by the packet communication apparatus according to the second embodiment.

Explained below with reference to FIG. 7 is a sequence of operations performed by the packet communication apparatus 200 according to the second embodiment. FIG. 7 is a flowchart for explaining a sequence of operations performed by the packet communication apparatus 200 according to the second embodiment.

As illustrated in FIG. 7, the NWP unit 201 in the packet communication apparatus 200 receives packets (Yes at Step S11) and determines whether or not to instruct the HWA unit 202 in the packet communication apparatus 200 to perform packet processing with respect to the received packets (Step S12). If it is determined not to instruct the HWA unit 202 to perform packet processing (No at Step S12), then the NWP unit 201 transfers the received packets to other packet communication apparatuses (Step S13). That marks the end of the operations.

On the other hand, if it is determined to instruct the HWA unit 202 to perform packet processing (Yes at Step S12), then the NWP unit 201 outputs the received packets to the HWA unit 202 via the VSW unit 203 (Step S14).

Then, the scheduler unit 212 in the VSW unit 203 determines whether or not the transfer speed of the packets that are input from the NWP unit 201 exceeds the processing speed of the HWA unit 202 (Step S15). If the transfer speed of the packets that are input from the NWP unit 201 is equal to or less than the processing speed of the HWA unit 202 (No at Step S15), then the scheduler unit 212 outputs the packets to the HWA unit 202 (Step S16). The system control then returns to Step S12.

On the other hand, if the transfer speed of the packets that are input from the NWP unit 201 exceeds the processing speed of the HWA unit 202 (Yes at Step S15), then the scheduler unit 212 searches for other packet communication apparatuses each of which includes the HWA unit that performs identical packet processing (Step S17).

At that time, the scheduler unit 212 determines whether or not the transfer speed of the packets that are input from the NWP unit 201 exceeds the total processing speed that is obtained by adding the processing speed of the HWA unit 202 and the processing speeds of the HWA units in the other packet communication apparatuses (Step S18). If the transfer speed of the packets that are input from the NWP unit 201 is equal to or less than the total processing speed that is obtained by adding the processing speeds (No at Step S18), then the scheduler unit 212 outputs the information regarding the other packet communication apparatuses that are retrieved as well as outputs the packets to the packet transfer unit 213. The system control then proceeds to Step S20.

On the other hand, if the transfer speed of the packets that are input from the NWP unit 201 exceeds the total processing speed that is obtained by adding the processing speeds (Yes at Step S18), then the scheduler unit 212 destroys the excess packets starting from the low-priority packets (Step S19), and outputs the remaining packets to the packet transfer unit 213.

Subsequently, to the other packet communication apparatuses that are retrieved by the scheduler unit 212, the packet transfer unit 213 transfers the packets that were input from scheduler unit 212 (Step S20).

As described above, if the transfer speed of packets exceeds the processing speed of the HWA unit 202, then the packet communication apparatus 200 according to the second embodiment searches for other packet communication apparatuses each of which includes the HWA unit that performs identical packet processing. Then, the packet communication apparatus 200 according to the second embodiment transfers the packets, which are input to the HWA unit 202, to the other packet communication apparatuses that are retrieved. For that reason, the packet communication apparatus 200 according to the second embodiment becomes able to divert the processing load on the corresponding HWA unit 202 to other packet communication apparatuses within the network. As a result, even in the case when the packet communication apparatus 200 according to the second embodiment is used as an edge-side packet communication apparatus within the network, the packet communication apparatus 200 can prevent a situation of having to take intensive processing load. Hence, the packet communication apparatus 200 can prevent to prevent congestion from occurring in the network.

Moreover, if the transfer speed of the packets exceeds the total processing speed that is obtained by adding the processing speed of the corresponding HWA unit 202 and the processing speeds of the HWA units in the other packet communication apparatuses, then the packet communication apparatus 200 according to the second embodiment destroys the excess packets. As a result, the packet communication apparatus 200 according to the second embodiment can prevent unnecessary packets from being output in the network.

Furthermore, when a plurality of other packet communication apparatuses is retrieved, the packet communication apparatus 200 according to the second embodiment transfers the packets depending on the processing speed ratio of the HWA unit installed in each of the other packet communication apparatuses. For that reason, the packet communication apparatus 200 according to the second embodiment can efficiently divert the processing load of the corresponding HWA unit 202 to the other packet communication apparatuses present in the network.

[c] Third Embodiment

Meanwhile, apart from the embodiments described above, the packet communication apparatus laid open in this application can be implemented in various different configurations. Thus, in a third embodiment, the explanation is given for other embodiments of the packet communication apparatus laid open in this application.

For example, in the second embodiment, the explanation is given for an example in which a single packet communication apparatus includes a single HWA unit. However, alternatively, a single packet communication apparatus can also include a plurality of HWA units. Thus, the following explanation is given for an example in which a single packet communication apparatus includes a plurality of HWA units.

Figure 8:
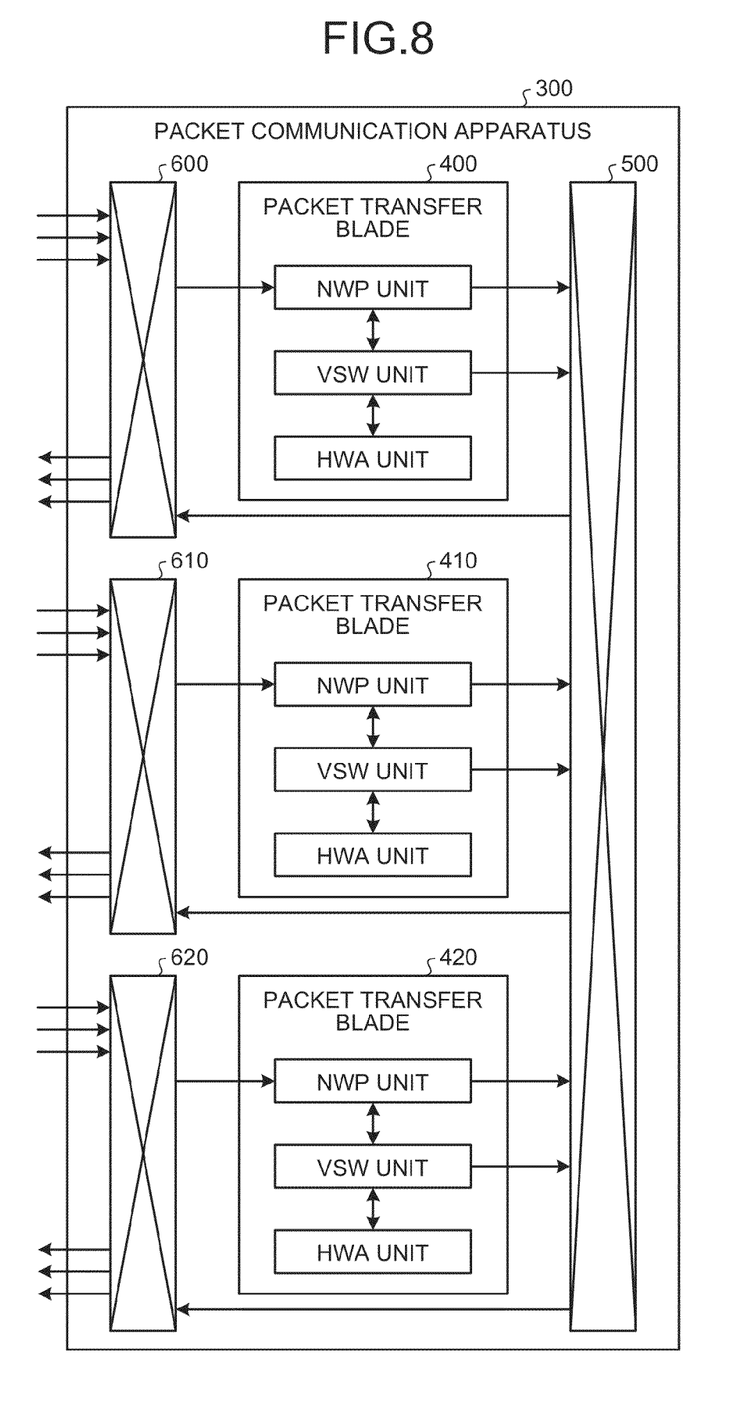
FIG. 8 is a diagram illustrating an exemplary configuration of a packet communication apparatus that includes a plurality of HWA units.

FIG. 8 is a diagram illustrating an exemplary configuration of a packet communication apparatus 300 that includes a plurality of HWA units. The packet communication apparatus 300 illustrated in FIG. 8 includes three packet transfer blades 400, 410, and 420 each of which has an NWP unit, a VSW unit, and an HWA unit.

Each of the three packet transfer blades 400, 410, and 420 is an apparatus identical to the packet communication apparatus 200 according to the second embodiment. Thus, in each of the three packet transfer blades 400, 410, and 420; the NWP unit, the VSW unit, and the HWA unit respectively correspond to the NWP unit 201, the VSW unit 203, and the HWA unit 202. Meanwhile, it is possible to have any number of packet transfer blades.

The packet communication apparatus 300 further includes a switch 500 as well as includes three loop-back pointers 600, 610, and 620. The switch 500 is an apparatus for relaying packets that are communicated among the three packet transfer blades 400, 410, and 420. The loop-back pointers 600, 610, and 620 are apparatuses that loop back the packets, which are relayed by the switch 500, to the packet transfer blades 400, 410, and 420, respectively.

Explained below is an example of a packet transfer operation performed by the packet communication apparatus 300 configured in the manner described above. Herein, the explanation is given under the assumption that the NWP unit in the packet transfer blade 400 receives packets from a predetermined port. Upon receiving packets from a predetermined port, the NWP unit in the packet transfer blade 400 determines whether or not to instruct the corresponding HWA unit to perform packet processing with respect to the received packets.

If it is determined to instruct the HWA unit to perform packet processing, the NWP unit in the packet transfer blade 400 outputs the received packets to the HWA unit via the corresponding VSW unit. If the transfer speed of the packets that are input from the NWP unit exceeds the processing speed of the corresponding HWA unit, then the VSW unit searches for other packet transfer blades each of which includes the HWA unit that performs identical packet processing. In the example illustrated in FIG. 8, it is assumed that the packet transfer blade 410 is retrieved as the packet transfer blade that includes the HWA unit which performs identical packet processing.

Then, the VSW unit of the packet transfer blade 400 determines whether or not the transfer speed of the packets that are input from the NWP unit exceeds the total processing speed that is obtained by adding the processing speed of the HWA unit in the packet transfer blade 400 and the processing speed of the HWA unit in the packet transfer blade 410. If the transfer speed of the packets that are input from the NWP unit exceeds the total processing speed, then the VSW unit in the packet transfer blade 400 destroys the excess packets starting from the low-priority packets, and outputs the remaining packets to the packet transfer blade 410.

Then, the switch 500 performs switching with respect to the packets from the packet transfer blade 400 and relays those packets to the loop-back pointer 610 corresponding to the packet transfer blade 410. Subsequently, the loop-back pointer 610 loops back the packets, which are relayed by the switch 500, to the packet transfer blade 410.

Thus, the NWP unit in the packet transfer blade 410 receives packets from a predetermined port as well as from the loop-back pointer 610, and determines whether or not to instruct the corresponding HWA unit to perform packet processing with respect to the received packets.

If it is determined to instruct the HWA unit to perform packet processing, the NWP unit in the packet transfer blade 410 outputs the received packets to the HWA unit via the corresponding VSW unit. If the transfer speed of the packets that are input from the NWP unit exceeds the processing speed of the corresponding HWA unit, then the VSW unit searches for other packet transfer blades each of which includes the HWA unit that performs identical packet processing. In the example illustrated in FIG. 8, it is assumed that no packet transfer blade can be retrieved as the packet transfer blade that includes the HWA unit which performs identical packet processing.

Then, the VSW unit in the packet transfer blade 410 determines whether or not the transfer speed of the packets input from the corresponding NWP unit exceeds the processing speed of the corresponding HWA unit. If the transfer speed of the packets input from the corresponding NWP unit exceeds the processing speed of the corresponding HWA unit, then the VSW unit in the packet transfer blade 410 destroys the excess packets starting from the low-priority packets, and outputs the remaining packets to the corresponding HWA unit. Thus, in the packet transfer blade 410, the HWA unit receives the packets from the NWP unit via the VSW unit; and sends back the post-packet-processing packets to the NWP unit via the VSW unit.

Then, the NWP unit in the packet transfer blade 410 implements the normal routing function and transfers the packets, which have been sent back by the corresponding HWA unit, to the packet transfer blade 420.

Subsequently, the switch 500 performs switching with respect to the packets from the packet transfer blade 410 and relays those packets to the loop-back pointer 620 corresponding to the packet transfer blade 420. Then, without looping back the packets that are relayed by the switch 500, the loop-back pointer 620 outputs the packets to the outside from a predetermined port.

In this way, in the packet communication apparatus 300; if the transfer speed of the packets exceeds the processing speed of an HWA unit installed therein, a search is performed within the packet communication apparatus 300 to find another HWA unit that performs identical processing. Subsequently, in the packet communication apparatus 300, the packets to be input to the HWA units are transferred to the HWA unit that is retrieved. Thus, the packet communication apparatus 300 includes a plurality of HWA units; and in case one of the HWA units happens to take intensive processing load, the packet communication apparatus 300 can divert the processing load to another HWA unit installed therein. Hence, when a plurality of HWA units is installed, the packet communication apparatus 300 can prevent congestion from occurring therein.

Thus, according to a packet communication apparatus that is laid open; it becomes possible to prevent congestion from occurring in a network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet communication apparatus comprising:
   a packet processing determining unit that receives packets and determines whether or not to instruct a first-type packet processing device in the packet communication apparatus to perform predetermined packet processing with respect to the received packets;
   a searching unit that, when a transfer speed of packets determined to be subjected to the predetermined packet processing by the packet processing determining unit exceeds a processing speed of the first-type packet processing device, searches for another packet communication apparatus that includes a second-type packet processing device which performs packet processing identical to the predetermined packet processing; and
   a transfer unit that transfers the packets to the other packet communication apparatus retrieved by the searching unit, wherein
   the transfer unit distributes, when the searching unit retrieves a plurality of the other packet communication apparatuses and the transfer speed of packets determined to be subjected to the predetermined packet processing by the packet processing determining unit is equal to or lower than a total processing speed that is obtained by adding the processing speed of the first-type packet processing device in the packet communication apparatus and a processing speed of the second-type packet processing device in each of the plurality of the other packet communication apparatuses that have been retrieved, the packets according to the processing speed of a packet processing device included in each of the plurality of the other packet communication apparatuses and transfers the distributed packets.

2. The packet communication apparatus according to claim 1, wherein, when the transfer speed of packets determined to be subjected to the predetermined packet processing by the packet processing determining unit exceeds the total processing speed, the searching unit destroys, from among the packets, packets whose transfer speed exceeds the total processing speed.

3. A packet transfer method implemented by a packet communication apparatus, the packet transfer method comprising:
   determining whether or not to instruct a first-type packet processing device in the packet communication apparatus to perform predetermined packet processing with respect to packets that are received as input;
   searching, when a transfer speed of packets determined to be subjected to the predetermined packet processing at the determining exceeds a processing speed of the first-type packet processing device, for another packet communication apparatus that includes a second-type packet processing device which performs packet processing identical to the predetermined packet processing; and
   transferring the packets to the other packet communication apparatus retrieved at the searching, wherein
   the transferring includes distributing, when a plurality of the other packet communication apparatuses are retrieved at the searching and the transfer speed of packets determined to be subjected to the predetermined packet processing at the determining is equal to or lower than a total processing speed that is obtained by adding the processing speed of the first-type packet processing device in the packet communication apparatus and a processing speed of the second-type packet processing device in each of the plurality of the other packet communication apparatuses that have been retrieved, the packets according to the processing speed of a packet processing device included in each of the plurality of the other packet communication apparatuses and transferring the distributed packets.

* * * * *